United States Patent
Frost et al.

(10) Patent No.: US 11,028,002 B2
(45) Date of Patent: Jun. 8, 2021

(54) APPARATUS AND METHOD FOR THERMALLY TREATING AN ANNULAR REGION OF AN INNER SURFACE OF A GLASS CONTAINER PRODUCED FROM A BOROSILICATE GLASS TUBE

(71) Applicant: Schott AG, Mainz (DE)

(72) Inventors: Robert Frost, Eggersriet (CH); Georg Haselhorst, Schmitten (DE)

(73) Assignee: SCHOTT AG, Mainz (DE)

( * ) Notice: Subject to any disclaimer, the term of this patent is extended or adjusted under 35 U.S.C. 154(b) by 0 days.

(21) Appl. No.: 14/801,876

(22) Filed: Jul. 17, 2015

(65) Prior Publication Data
US 2016/0016841 A1 Jan. 21, 2016

(30) Foreign Application Priority Data
Jul. 18, 2014 (DE) .................... 10 2014 214 083.8

(51) Int. Cl.
C03B 32/00 (2006.01)
C03B 29/02 (2006.01)
(Continued)

(52) U.S. Cl.
CPC .............. *C03B 32/00* (2013.01); *C03B 21/06* (2013.01); *C03B 23/11* (2013.01); *C03B 25/02* (2013.01);
(Continued)

(58) Field of Classification Search
CPC ....... C03B 23/23; C03B 23/13; C03B 9/3841; C03B 9/385; C03B 9/3858; C03B 9/3663;
(Continued)

(56) References Cited

U.S. PATENT DOCUMENTS

| 2,199,332 A | 4/1940 | Dichter |
| 2,935,819 A | 5/1960 | Dichter |

(Continued)

FOREIGN PATENT DOCUMENTS

| DE | 19812056 | 10/1999 |
| EP | 1923359 | 5/2008 |

(Continued)

OTHER PUBLICATIONS

Wikipedia, "Erlenmeyer Flask", Version Jun. 16, 2014, XP055234912, 3 pages.

(Continued)

*Primary Examiner* — John M Hoffmann
(74) *Attorney, Agent, or Firm* — Ohlandt, Greeley, Ruggiero & Perle, L.L.P.

(57) ABSTRACT

A method for thermally treating an annular region of an inner surface of a glass container produced from a borosilicate glass tube is provided. The annular region is disposed at a tubular portion of the glass container and is disposed adjacent to a glass container bottom. The method includes: forming the glass container bottom from the glass tube; heating the annular region of the inner surface of the tubular portion to a treatment temperature $T_{Beh}$ above the transformation temperature $T_G$, wherein the annular region is adjacent to the glass container bottom; maintaining the treatment temperature $T_{Beh}$ for a certain time period; and cooling the glass container to room temperature.

11 Claims, 3 Drawing Sheets

(51) Int. Cl.
  *C03B 23/11*  (2006.01)
  *C03C 23/00*  (2006.01)
  *C03B 21/06*  (2006.01)
  *C03B 25/02*  (2006.01)
  *C03B 35/06*  (2006.01)

(52) U.S. Cl.
  CPC .............. *C03B 29/02* (2013.01); *C03B 35/06* (2013.01); *C03C 23/007* (2013.01)

(58) Field of Classification Search
  CPC ... C03B 32/00; C03C 23/007; C03C 23/0025; C03C 17/004
  See application file for complete search history.

(56) References Cited

U.S. PATENT DOCUMENTS

| | | | | |
|---|---|---|---|---|
| 3,215,517 | A | | 11/1965 | Zimmermann |
| 3,368,588 | A | * | 2/1968 | Meyer .................... C03B 23/09 138/178 |
| 3,549,524 | A | * | 12/1970 | Haller .................... B01D 15/08 210/198.2 |
| 3,837,534 | A | * | 9/1974 | Natelson ............... B01L 3/0293 222/137 |
| 3,963,468 | A | * | 6/1976 | Jaeger ............... C03B 37/01205 65/386 |
| 4,044,936 | A | * | 8/1977 | Obersby ............. C03B 33/0955 219/121.6 |
| 4,052,184 | A | * | 10/1977 | Anderson ........... C03B 23/0026 65/102 |
| 4,378,989 | A | * | 4/1983 | La Fiandra ............... B23B 1/00 65/271 |
| 4,386,164 | A | * | 5/1983 | Moser .................... C03C 3/091 501/56 |
| 4,731,254 | A | | 3/1988 | Heineken |
| 4,748,307 | A | * | 5/1988 | Lamb .................... C03B 37/029 219/634 |
| 5,232,481 | A | * | 8/1993 | Johnston ............... C03C 21/002 65/30.13 |
| 5,779,753 | A | * | 7/1998 | Vetter ................ B23K 26/0081 65/105 |
| 6,415,631 | B1 | * | 7/2002 | Weston .................... A61M 5/30 264/154 |
| 7,980,096 | B2 | * | 7/2011 | Bartsch .................... A61J 1/06 65/108 |
| 8,196,807 | B2 | * | 6/2012 | Grimard .................. A61J 1/00 219/121.85 |
| 2003/0029849 | A1 | * | 2/2003 | Trinks .................... B41M 5/262 219/121.69 |
| 2004/0129026 | A1 | | 7/2004 | Bartsch |
| 2006/0218972 | A1 | * | 10/2006 | Brik ....................... C03B 5/265 65/492 |
| 2009/0099000 | A1 | | 4/2009 | Kuwabara et al. |
| 2010/0255229 | A1 | | 10/2010 | Wada |
| 2012/0060558 | A1 | * | 3/2012 | Haselhorst ........... C03B 23/092 65/29.21 |

FOREIGN PATENT DOCUMENTS

| | | |
|---|---|---|
| EP | 2239237 A2 | 10/2010 |
| EP | 2546206 A1 | 1/2013 |
| JP | 63S170233 | 7/1988 |
| JP | H0676234 | 9/1994 |
| WO | 2009116300 | 9/2009 |

OTHER PUBLICATIONS

Ohkubo,"Quantitative visualization of temperature field in non-luminous flame by flame reaction technique", 2012, Journal of Visualization, pp. 101-108.

* cited by examiner

APPARATUS AND METHOD FOR THERMALLY TREATING AN ANNULAR REGION OF AN INNER SURFACE OF A GLASS CONTAINER PRODUCED FROM A BOROSILICATE GLASS TUBE

CROSS REFERENCE TO RELATED APPLICATIONS

This application claims benefit under 35 U.S.C. § 119(a) of German Patent Application No. 10 2014 214 083.8 filed Jul. 18, 2014, the entire contents of which are incorporated herein by reference.

BACKGROUND

1. Field of the Invention

The present invention relates to a method for thermally treating an annular region of an inner surface of a glass container produced from a borosilicate glass tube, wherein the annular region is located on a tubular portion of the glass container and is adjacent to a glass container bottom. Furthermore, the invention relates to a glass processing apparatus and a bottom side machine therefore for producing glass containers from a borosilicate glass tube.

2. Description of Related Art

The generic glass containers comprise a cylindrical, tubular portion or tapered portion. In particular, the glass containers are manufactured as syringes and vials and are mainly used for the storage and administration of pharmaceutical products such as medications.

The starting material of the generic glass container is a glass tube. The glass processing apparatuses used for the production of the glass container comprise a parent machine and a bottom side machine, both of which are rotatable and include a plurality of holding units which, for example, comprise a chuck. Typically, the bottom side machine is positioned below the parent machine. In the chuck of the parent machine a glass tube of approximately 1.5 m length is chucked, wherein the glass tube protrudes by a certain length downwards beyond the chuck. At the downward projecting open end the glass tube is subjected to certain processing steps which are carried out at different processing stations. To this end, the parent machine and thus the chucks are rotated by a certain angle from one processing station to the next. If the downward protruding end of the glass tube is finished, such that it comprises, for example, a rolled rim or a thread, a part of the glass tube has to be separated. In the processing station in which the separation step is carried out the corresponding chuck of the parent machine is placed in axial alignment with a chuck of a holding unit of the bottom side machine. The holding unit of the bottom side machine is axially movable and engages the glass tube somewhat above the downward protruding end of the glass tube. In the area between the chuck of the parent machine and the chuck of the bottom side machine usually a flame provided by a gas burner of a separating means is directed towards the glass tube for heating, wherein the glass tube can also be heated in other ways. Here, the gas burner of the separation means in most cases is fixed in its position. In order to achieve a rotationally symmetrical heating over the circumference of the glass tube as much as possible the holding units are rotatable around their own axes. The glass tube is heated until it is so inviscid that the part which is chucked within the chuck of the bottom side machine can be separated from the rest of the glass tube by driving down the chuck of the bottom side machine. Thereby the heated portion of the glass tube tapers and constricts itself to such an extent that at the separation position respectively a closed glass container bottom is formed, one at the part pulled off which is disposed in the chuck of the bottom side machine and one at the part of the glass tube which remains within the chuck of the parent machine.

In the following, that part of the glass tube is considered which after the separation is located in the chuck of the bottom side machine. As stated above, the free open end is already finished, however, the glass container bottom of the glass container now obtained has not yet the desired shape. The glass container bottom in this processing state is disposed above the open end with respect to the direction of action of the gravitational force, which brings about the following things: as described above, the glass container bottom has been produced by a thermal separation step, so that the viscosity of the glass in the bottom area is yet so low that the glass container bottom more or less sags downwardly depending on the diameter of the glass tube used. In addition, the glass container bottom has a radially varying wall thickness. In order to provide the glass container bottom of the glass container with the desired properties, it has to be subjected to further, mainly thermal processing steps. In order to counteract the sagging of the bottom, a gas, typically air, is blown into the glass container through the open end of the glass container, thereby creating a back pressure which supports the glass container bottom.

With the blowing of a gas stream a further aspect is associated. For the storage of pharmaceutical products preferably borosilicate glasses are used because they provide a high hydrolytic stability at relatively low costs. In order to lower the melting point borosilicate glasses also include sodium. However, Na ions are not present in the glass by a valence bond but migrate through the glass matrix which is primarily determined by the $SiO_2$. If the glass tube is heated for separation temperatures of more than 1200° C. are required which are well above the evaporation temperature of sodium. Consequently large amounts of Na evaporate away from the glass container bottom and are deposited again at various sites in the glass container. The evaporation of sodium also has the effect that boron is entrained in the form of borates and also evaporates, even if the borates are incorporated significantly stronger in the glass matrix compared to sodium.

The glass container is thermally treated very strongly at the glass container bottom, while at the cylindrical portion in the generic method no heat treatment occurs. Consequently in the glass container strong thermal stresses arise which may lead to the fact that the glass container will burst after cooling. In order to prevent this, in many cases it is advisable to carry out a further thermal treatment in order to relief the stresses. This thermal treatment is also referred to as stress relief and takes place in a stress relief furnace at a stress relief temperature at which the glass is above the upper stress relief point. At the upper stress relief point the glass has a viscosity of $10^{13.3}$ dPa sec. For the borosilicate glass tubes relevant here the upper stress relief point is reached at about 550 to 600° C., which is significantly below the temperatures necessary for the separation of the glass container from the glass tube. Here, most of the sodium borate evaporates. The non-evaporated parts burn into the wall of the glass container. The problem here is that sodium ions can migrate into the substance that is stored in the glass containers. In particular for pharmaceutical substances this is not desirable. The migration tendency depends largely on the substances stored in the glass containers and their pH-value. By supplying the gas stream into the glass container or into the glass tube also a part of the sodium is removed from the glass container during the separation process such that a less amount of sodium can burn into the wall. The gas stream needs only to ensure that the sodium is also removed from the glass container and not just only swirls around. Further requirements for the properties of the gas stream need not to be satisfied. The tendency that sodium can migrate into the substances stored within the glass containers in this context is also referred to surface alkalinity.

In the documents EP 2546206 A1 and EP 2239237 A2 methods are described by which the surface alkalinity can be reduced by means of a thermal treatment of the inner surface of the glass container.

Not only sodium borates, but alkali metal borates in general exhibit another disadvantageous property. The evaporation rate of the alkali metal borates increases exponentially with increasing temperature. In processing the bottom of the glass container sodium borate evaporates from the bottom area and is deposited in a condensation zone on the tubular portion of the glass container. In the condensation zone the glass is already relatively cold. Between the glass container bottom and the condensation zone also a diffusion zone is formed in which more sodium borate diffuses into the glass than is evaporated. The diffusion zone extends over an annular region of the inner surface of the tubular portion of the glass container. In the diffusion zone an accumulation of sodium borate occurs simultaneously with a depletion in the glass container bottom, wherein the depletion in the glass container bottom does not have any negative consequences. The accumulation of boron in the form of borate in the diffusion zone, however, has the following effects:

In the near-surface region of the diffusion zone (about 50 to 500 nm starting from the inner surface of the glass container) the accumulation of boron or borate causes that the borosilicate glass mainly composed of Si, Na and B decomposes during the cooling process because here the process is in the range of a miscibility gap in the ternary phase diagram of Si—Na—B. Due to the miscibility gap two phases with different composition are formed which inevitably have different chemical and physical properties. One of the two phases also has a lower hydrolytic stability, so that it is seriously attacked by the substances stored in the glass container. The resulting surface structure also has a different thermal expansion coefficient with respect to the unmodified borosilicate glass, which causes stresses in the near-surface region of the diffusion zone. As a consequence, particulate glass components are detached from the surface which have a significantly lower extension in one axis than in the plane perpendicular to this axis. These particles are then transferred to the substance stored in the glass container which is particularly serious if the substance is administered as a medicine. The detachment of the particulate glass components from the glass surface is also referred to as delamination.

SUMMARY

It is an object of the present invention to provide a method by which the diffusion zone can be treated so that it no longer has the disadvantages described above and in particular can be provided with an improved delamination resistance. In addition, it is an object of the present invention to provide a glass processing apparatus and a bottom side machine by means of which the method according to the invention can be carried out.

The method according to the invention comprises the following steps: forming the glass container bottom from the glass tube; heating the annular region, which is adjacent to the glass container bottom, of the inner surface of the tubular portion to a treatment temperature $T_{Beh}$ above the transformation temperature $T_G$; maintaining the treatment temperature $T_{Beh}$ for a certain time period; and cooling the glass container down to room temperature.

The step of forming the glass container bottom is carried out in a known previously discussed manner. After the glass container bottom is completely formed, the step of heating of the annular region of the inner surface of the tubular section is carried out. This step need not temporally immediately follow the forming step. Rather, the glass container can also be stored for a longer, basically unlimited time before being heated to the treatment temperature, such that the steps of forming the glass container and heating the annular region can be carried out independently both temporally and spatially. The only requirement is that the glass container bottom is already completely formed before the annular region is heated. Thus, the heating to the treatment temperature in the case of a glass container which has been stored for an extended time period can be carried out starting from room temperature or from the corresponding temperature in the case that the glass container is still warm from the bottom forming process. If the treatment temperature is reached it is maintained for a certain time period. The diffusion zone is located at the annular region and may extend completely or partially over it, wherein it is peripherally closed.

The transformation temperature of relevant glasses is roughly between 490° C. and 600° C. In the borosilicate glass tubes used for the storage of pharmaceutical products the transformation temperature is between 525° C. and 565° C. Thus, depending on the glasses used the treatment temperature can be selected correspondingly.

During the period for which the annular region is maintained at the treatment temperature the boron which has accumulated in the near-surface region of the diffusion zone diffuses out of it again. The boron content in the near-surface region of the diffusion zone is therefore adjusted to the content in the remaining glass container. As a consequence, in the near-surface region again arises a stoichiometric mixture ratio which allows a phase separation-free cooling, because the local composition of the borosilicate glass within the near-surface region of the diffusion zone is no longer in the area of the miscibility gap of the ternary phase diagram of Si—Na—B previously explained in detail. The adverse effects associated with decreased delamination resistance can thus be significantly reduced or even completely eliminated.

The cooling step can be carried out actively, i.e. with a controlled cooling, following a predefined temperature profile, or passively, for example by storing the finished glass containers at room temperature.

In the thermal treatment processes disclosed in EP 2546206 A1 and EP 2239237 A2 the entire inner surface of the glass container, and not only the annular region is heated, wherein the glass container is not heated above the transformation temperature $T_G$.

It has been found to be advantageous if the annular region is heated to a treatment temperature $T_{Beh}$ between 700 and 1000° C. In this temperature range it is ensured that the boron can actually diffuse out of the near-surface region of the diffusion zone. At a treatment temperature above this range the boron can in fact diffuse out of the diffusion zone, however, there is a risk that a new diffusion zone is formed in the adjacent areas so that the problems caused by the boron accumulation would not or only partly be solved. If the treatment temperature is below the range between 700 and 1000° C., it is not guaranteed that the boron can diffuse out of the diffusion zone at all. If so, then it diffuses out at a very low rate of diffusion, so that the glass container has to be maintained at the treatment temperature for a long time and the method according to the invention would be prolonged, which is not desirable from a manufacturing point of view. The temperature range disclosed herein has been found to represent a good compromise for common borosilicate glass tubes.

The treatment temperature is maintained for a time period between 1 and 20 seconds. The time period is adapted to the chosen treatment temperature. The higher the treatment temperature, the shorter the time period can be. A time period of 1 to 20 seconds ensures for the indicated treatment temperatures that the boron diffuses out of the diffusion zone to such an extent that the problems associated with boron accumulation can be reduced to a negligible level or eliminated completely. The time period of 1 to 20 seconds also from a manufacturing point of view is not too long, so that the manufacturing process of the glass containers is not substantially prolonged in comparison with the conventional manufacturing process.

Preferably, the annular region is thermally treated by means of a laser starting from the interior of the glass container. It is to be noted that the thermal treatment is not only restricted to the heating of the annular region to the treatment temperature, but may also include maintaining the treatment temperature for a certain time period. The laser provides a laser beam which heats the annular region when it impinges thereupon. For example, a $CO_2$ laser may be used which provides a laser beam having a wavelength of 9 to 10.6 µm. A significant advantage of this process variant is that it is possible to treat only the near-surface region of the glass container in the annular region due to the high absorption of the laser beam having the specified wavelength by the glass. The heat treatment is restricted only to the affected area, so that the remaining portions of the glass container are not affected. This is advantageous in that the viscosity of the glass container in the treated areas will be greatly reduced by the heat treatment and a local flow can be caused, whereby the glass container can be deformed, which is undesirable. Because the laser heats the glass container locally within very narrow limits deformations are restricted to the treated area and have no considerable impacts on the overall shape of the glass container. In particular, the formation of plastic deformations which can cause optical distortions is reduced, which is disadvantageous for the optical final inspection of the substance stored in the glass container.

Alternatively, the annular region is thermally treated from outside of the glass container by means of a gas burner or a laser. In order to be able to heat the near-surface region at the inner surface of the glass container to the treatment temperature, the entire glass container wall has to be heated throughout in the annular region. As a result, the treated area compared to a treatment from the inside is significantly enlarged, so that a local flow and plastic deformations caused thereby cannot be avoided, which, however, within certain limits are not of any significant disadvantage. However, such a treatment can be carried out much easier from the outside of the glass container since the gas burner or the laser need not be introduced into the glass container. Consequently corresponding shifting means can be dispensed with, which simplifies the glass processing apparatuses. In addition, the oxygen supply of the gas burner is always ensured in this process variant. If the gas burner would be introduced into the glass container, this is not guaranteed, so that the flame would change in its temperature or would completely go out. Only gas burners specially developed for this application could be used, which in turn is associated with cost disadvantages. If the thermal treatment is carried out from outside of the glass container commercially available gas burners can be used. Alternatively, the annular region can be treated thermally with short-wave infrared radiation.

In an advantageous embodiment of the method according to the invention the glass container is preheated to a preheating temperature $T_V$ of 400 to 660° C. and in particular to a preheating temperature $T_V$ at which the viscosity of the glass container is $10^{12.4}$ dPa sec or less prior to the heating of the annular region to the treatment temperature $T_{Beh}$. The preheating not only concerns the annular region but also at least the portions of the glass container adjacent to the annular region, however, also the entire glass container can be preheated. The preheating ensures that the temperature gradients are less steep in the treatment of the annular region within the glass container compared to non-preheated glass containers. Consequently, the thermal stresses induced in the glass container during the thermal treatment of the annular region are significantly lower. The thermal stresses may lead to breaking of the glass container during the thermal treatment and during or after the cooling process. In particular, in the case of using a laser high temperature gradients occur, since, as already described, locally very restricted areas of the glass container are heated. The stresses totally induced in the glass container are substantially reduced by the preheating of said region, while the glass container itself will not be deformed.

In a further embodiment of the method according to the invention the glass container is stress relieved in a stress relief furnace at a stress relief temperature $T_E$ at which the viscosity of the glass container is $10^{13.3}$ dPa sec or less. Even in the case that the entire glass container is preheated it cannot be prevented that during the heating of the annular region beyond the transformation temperature $T_G$ thermal stresses are induced in the glass container so that during or after the cooling process crack formation or even a damage of the glass container occurs. The stress relief within the stress relief furnace serves to reduce these thermal stresses. If the viscosity is $10^{13.3}$ dPa sec the treated glass is at the so-called upper stress relief point which is described in detail in DIN ISO 7884-7. In commercially available borosilicate glasses this viscosity is achieved at a temperature between 550 and 600° C. Since such a stress relief is also used in known methods for producing glass containers this step compared with these methods represents no additional expense.

In a preferred further embodiment of the method according to the invention the time period between the step of forming the glass container bottom from the glass tube and the step of heating the annular region is 20 to 240 seconds, in particular 30 to 60 seconds. As already described above during the formation of the glass container bottom a high concentration of a vaporous or gaseous borates is produced in the glass container, of which a part diffuses into the near-surface regions of the annular region. If the annular region is already thermally treated when the concentration of vaporous borates is high there is a risk that a new diffusion zone with an increased boron concentration is formed on the inner surface of the glass container. The processes essential here are similar to those that occur in the bottom formation. If the step of heating the annular region is carried out only with a time delay after the step of forming the glass container bottom a large part of the vaporous borates is deposited on the inner surface. Then the condensed borate is no longer or only to an negligible extent able to diffuse into the near-surface region of the inner surface of the glass container during the thermal treatment of the annular region and to form a new diffusion zone. The condensed borate is water soluble and can be easily removed in a cleaning step.

Preferably, between the step of forming the glass container bottom of the glass tube and the step of heating the annular region the glass container is blown out with a gas. This step also serves to remove the vaporous borates which accumulate inside the glass container after the bottom forming process from the glass container in order to ensure that they will not diffuse into the near-surface regions of the inner surface during the heating of the annular region and to prevent that they can form a new diffusion zone.

The annular region has an end facing to the bottom and an end facing away from the bottom, wherein the end facing to the bottom has a distance LB from the inside of the glass container bottom along a container axis of preferably 0 to 20 mm. It has been found that the diffusion zone for nearly all common glass container volumes has a corresponding distance from the inside of the container bottom. Thus, it is not necessary to treat the entire internal surface of the glass container, but only from the specified distance. Here, the distance LA between the end facing to the bottom and the end facing away from the bottom is between 1 and 10 mm. For almost all common standard glass container volumes the diffusion zone has such an extension. Consequently, the treatment time and the energy consumption can be restricted correspondingly, so that the step of heating the annular region which is adjacent to the glass container bottom can be carried out particularly effectively.

The object is further achieved by a bottom side machine of a glass treating apparatus for producing glass containers from a borosilicate glass tube by a method according to any one of the embodiments previously illustrated, wherein the bottom side machine comprises one or more holding units for holding the glass container, wherein the holding units are mounted rotatably about a rotation axis of the bottom side machine in order to carry the glass container to a number of primary processing stations, wherein at least at one of the processing stations a separation means for separating the glass container from the glass tube is disposed. Here, the bottom side machine comprises one or more further processing stations for thermally treating an annular region of an inner surface of the glass container, wherein the holding units are configured such that they carry the glass container to the further processing stations, too. The advantages that can be achieved with the bottom side machine according to the invention are similar to those that have been specified for the method according to the invention. In addition, it should be emphasized that the method according to the invention can be integrated into a known bottom side machine which is commonly used for the production of glass containers, so that the effort for implementing the method according to the invention can be kept low.

Preferably, one or more of the further processing stations include a gas burner and/or a laser. Gas burners and lasers are the means of choice for performing the method according to the invention, however, other heating sources may be used. However, there is a broad experience with gas burners and lasers, so that their use for heating the annular region is well established.

In one embodiment to be emphasized the bottom side machine according to the invention comprises a pressure source for providing a gas stream and a duct system communicating with the pressure source for guiding the gas stream to the holding units and for introducing the gas stream into the glass tube or into the glass container. The gas stream may on the one hand bring about a supporting effect during the bottom formation, so that the glass container bottom of the glass container can be manufactured with a relatively uniform wall thickness. On the other hand it can be used for blowing out the vaporous borate from the container after the bottom forming process, thereby preventing the formation of a further diffusion zone during the treatment of the annular region. Herein, the gas does not have to be introduced with a separately formed flow. It must be only guaranteed that the gas volume is exchanged within the interior of the glass container, for which purpose no special provisions are required.

Furthermore, the object is also achieved by a glass processing apparatus for producing glass containers from a borosilicate glass tube by a method according to any one of the aforementioned exemplary embodiments, which comprises a parent machine and a bottom side machine, wherein the bottom side machine comprises one or more holding units for holding the glass container, wherein the holding units are mounted rotatably about an axis of rotation of the bottom side machine in order to carry the glass container to a number of primary processing stations, wherein at least at one of the primary processing stations a separation means for separating the glass container from the glass tube is disposed. Moreover, the bottom side machine comprises one or more further processing stations for thermally treating an annular region of an inner surface of the glass container, wherein the holding units are configured such that they carry the glass container to the further processing stations, too. With this glass processing apparatus the same advantages and technical effects are achieved which have been discussed with respect to the bottom side machine.

The object is further achieved by a glass processing apparatus for producing glass containers from a borosilicate glass tube by a method according to any of the preceding exemplary embodiments, wherein the glass processing apparatus comprises a parent machine, a bottom side machine comprising one or more holding units for holding the glass container and a stress relief furnace for stress relieving the glass container, wherein the holding units are mounted rotatably about an axis of rotation of the bottom side machine in order to carry the glass container to a number of processing stations, wherein at least at one of the processing stations a separation means for separating the glass container from the glass tube is disposed. Here, a heat treatment station for thermally treating an annular region of an inner surface of a glass container made from a borosilicate glass tube is disposed between the bottom side machine and the stress relief furnace.

The arrangement of the heat treatment station between the bottom side machine and the stress relief furnace refers to the transport direction of the glass container during the production process. From the bottom side machine the glass container is carried into the heat treatment station and from there into the stress relief furnace. Again, the advantages and technical effects that can be achieved with the glass processing apparatus according to the invention correspond to those which have been presented for the method according to the invention. In this case, the heating of the annular region is carried out in a separate heat treatment station which may be located in close proximity to the bottom side machine and the parent machine, so that the annular region according to the method can be treated in due time after the bottom formation. The production process of the glass container does not have to be substantially modified, so that the retrofitting expense of a known glass processing apparatus can be kept relative low. Although basically the thermal treatment of the annular region can be integrated into a commercial bottom side machine, with a separate heat treatment station the heat treatment can be made more flexible. The space for a bottom side machine is limited, and moreover, the heat treatment has to fit into the timing predetermined by the bottom side machine, while the thermal treatment of the annular region can be carried out in the separate heat treatment station independently from the timing of the bottom side machine.

Preferably, the heat treatment station comprises a gas burner and/or a laser, wherein the laser provides a laser beam. As already explained with respect to the bottom side machine, gas burners and lasers are the means of choice for thermally treating the annular region, wherein for this purpose also other means can be used. In using a laser encapsulations must be provided in order to avoid any danger the laser has for people in its environment. These encapsulations can be realized more easily in a separate heating station than in a bottom side machine.

Here, the gas burner and/or the laser are advantageously arranged such that the annular region can be treated from outside of the glass container. For the heat treatment station, too, applies that the annular region of the glass container can be heated much easier from the outside than from the inside, so that the expense of the technical equipment is significantly lower. In particular, no shifting means must be provided for introducing the laser or the gas burner into the glass container. In addition, it is not necessary to provide a separate oxygen supply for the gas burner in order to ensure that the flame continuously burns as desired in the interior of the glass container, such that no additional expense is necessary.

In an alternative embodiment the laser arranged so that the annular region can be treated by the laser beam from the inside of the glass container. As already stated in using the laser there arises the possibility to treat only the near-surface region of the inner surface of the glass container so that in contrast to a treatment from the outside not the entire container wall has to be heated. As a result, the thermal stress of the glass container as well as the energy consumption will be restricted to a minimum, such that the thermal treatment of the annular region can be conducted very effectively.

Preferably, the laser comprises a guide portion for guiding the laser beam. As a result, the laser beam is guided relatively close to the annular region within the glass container, before it exits to the outside. Thus, on the one hand the operational reliability is increased, since the laser beam propagates unprotected over a minimized distance, and on the other hand the propagation of the laser beam is not disturbed by external influences.

In a further embodiment the heat treatment station includes a shifting means for introducing and retracting the guide portion into and from of the glass container. Here, on the one hand the shifting means can move only the glass container so that the guide portion itself is stationary and the glass container is moved relative to the guide portion. On the other hand, the guide section itself may be configured movable so that it can be shifted relative to the glass container. Preferably, both the glass container and the guide portion will be configured movably by the shifting means. Thus it is possible to keep the movements of the glass container and the guide portion as easy as possible, which leads to a simplification of the mechanics of the guide portion.

Preferably, the guide portion is mounted rotatably about the axis of the laser beam and comprises a deflection means for deflecting the laser beam. In this exemplary embodiment the guide portion is configured approximately tubular and comprises optical components by means of which the laser beam is deflected by approximately 90°. If the guide portion is disposed within the glass container the guide portion needs only to be rotated about the axis of the laser beam, whereby the annular region is thermally treated completely around its circumference at a fixed distance from the glass container bottom. By a translational movement along the laser beam the entire annular region can be treated.

Here, it is preferable that the guide portion is configured such that it causes a widening of the laser beam. A laser focuses monochromatic light onto a very small area, so that without a widening of the laser beam the thermal treatment of the annular region would take a relatively long time. Ideally, the laser beam is widened so much that it reaches the width of the annular region when impinging onto the inner surface of the glass container. In this case, the glass container needs only to be rotated over 360° about its longitudinal axis in order to treat the entire annular region thermally. As a result, no translational movement is necessary during the treatment, so that the annular region can be thermally treated within a short time. If it should not be possible to widen the laser beam to the width of the annular region, an additionally translational movement is necessary, so that the widened laser beam can cover the entire annular region. The widening can already take place in the laser itself, or the deflection means causes the widening. The laser beam after exiting the laser usually has a circular cross section, while after widening it may preferably have an elliptical or rectangular cross section.

In a further embodiment the heat treatment station comprises a support means by means of which the glass container is supported and can be rotated about the container axis. This embodiment is particularly suitable for gas burners, since they can be rotatably mounted about the glass body in a relatively complex manner. But also for lasers this embodiment offers benefits because here the guide portion does not need to be configured rotatably.

The glass processing apparatus according to the invention is further configured such that the bottom side machine comprises a pressure source for providing a gas stream and a duct system communicating with the pressure source for guiding the gas stream to the holding units and for introducing the gas stream into the glass tube or into the glass container. The gas stream may on the one hand bring about a supporting effect during the bottom formation so that the glass container bottom of the glass container can be manufactured with a relatively uniform wall thickness. On the other hand it can be used for blowing out the vaporous borate from the container after the bottom formation process, whereby the formation of a further diffusion zone during the thermal treatment of the annular region is prevented.

The object is also achieved by a glass processing apparatus for thermally treating an annular region of an inner surface of a glass container made from a borosilicate glass tube by means of a method comprising the steps of: heating the annular region of the inner surface of the tubular portion which is adjacent to the glass container bottom to a treatment temperature above the transformation temperature; maintaining the treating temperature for a predetermined time period; stress relieving the glass container in a stress relief furnace at a stress relief temperature at which the viscosity of the glass container is $10^{13.3}$ dPa sec or less; and cooling the glass container to room temperature, wherein the glass processing apparatus comprises a heat treatment station for thermally treating the annular region and a stress relief furnace for stress relieving the glass container. As mentioned above, for achieving the object according to the invention it is not necessary to perform the step of forming the glass container bottom from the glass tube temporally immediately prior to the step of heating the annular region. The heating of the annular region may thus be carried out temporally and spatially independent from the process of forming the glass container bottom. In particular, glass containers already produced and stored for a longer time period may be subsequently treated according to the invention. In this embodiment of the glass processing apparatus one starts from the finished formed glass container and only the annular region is correspondingly thermally treated, the glass container is relieved and subsequently cooled. This glass processing apparatus may be installed at a completely different place than the bottom side machine and the parent machine.

The heat treatment station preferably comprises a gas burner and/or a laser, wherein the laser provides a laser beam. Herein, gas burners and lasers represent the means of choice for performing the method according to the invention, however, other heat sources may also be used. However, the experience with gas burners and lasers is so large so that their use for heating the annular region can be well controlled.

Furthermore, the object is achieved with a glass container which is produced by a method in which the annular region is thermally treated from the outside of the glass container by means of a gas burner or a laser, wherein said glass container has a plastic deformation in the tubular portion and in the annular region, wherein the annular region is thermally treated between an end facing to the bottom and an end facing away from the bottom and the distance between the end facing to the bottom and the inner side of the glass container bottom along a container axis is between 0 and 20 mm and the distance between the end facing to the bottom and the end facing away from the bottom is between 1 and 10 mm. Plastic deformations are typically irreversible changes in the molecular arrangement. As already explained above, the entire container wall has to be heated in a thermal treatment from the outside of the glass container which leads to plastic deformations due to local flow of the glass, wherein the local flow is caused by the low viscosity of the heated area. In the use of gas burners the back pressure, the gas flowing out exerts on the glass container, causes an increased formation of the plastic deformation compared to the thermal treatment by means of a laser. Plastic deformations also occur in the use of lasers, but to a lesser extent.

As can be seen, the plastic deformation can be formed only in the regions of the tubular portion, which have been heated to a very high temperature owing to the thermal treatment of the annular region. This applies in particular to the annular region itself and to the region between the annular region and the glass container bottom. The plastic deformations can be particularly made visible when the glass container is held against a background with a zebra stripe-like pattern. The plastic deformations are a simple realizable evidence that the glass container has been processed by means of the method according to the invention and therefore has a high delamination resistance. As previously mentioned the thermal treatment can also be carried out with a large time lag with respect to the actual manufacture. If, however, it should not be possible to make a clear statement as to whether a particular glass container has been treated by means of the method according to the invention or not, the thermal deformation can be used as a corresponding evidence.

BRIEF DESCRIPTION OF THE DRAWINGS

Hereinafter the invention is explained in detail based on preferred exemplary embodiments with reference to the accompanying drawings. In the drawings.

DETAILED DESCRIPTION

Figure 1:
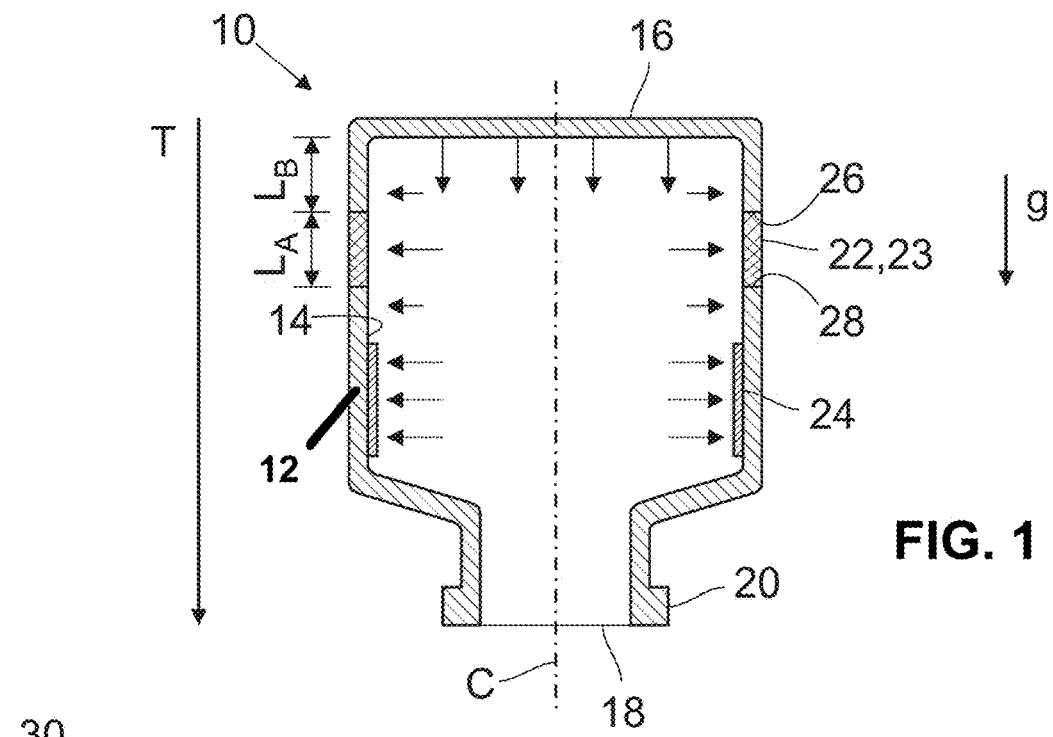
FIG. 1 shows a glass container in which the evaporation, diffusion and precipitation processes taking place during the processing are shown in simplified form.

FIG. 1 shows a glass container 10 based on which the processings during the production process essential for the invention will be explained in more detail. The glass container 10 has a container axis C and is shown such as it is aligned during and immediately after the bottom formation. As mentioned above, the glass container 10 is produced from a glass tube. Consequently, the glass container 10 comprises a tubular portion 12 having an inner surface 14. In addition, a glass container bottom 16 is disposed upwardly adjacent to the tubular portion 12. Furthermore, the glass container 10 in the orientation shown comprises an open end 18 extending downwardly with a rolled rim 20, onto which, for example, a closure can be applied.

As already mentioned several times, the glass container 10 is separated from the rest of the glass tube by a thermal separation process so that the glass container 10 has the highest temperature at the glass container bottom 16 during the separation process. The temperature T decreases towards the open end 18 as is indicated by the arrow. As also mentioned, the glass container bottom 16 has to be subjected to further thermal processings after the separation process in order to bring it into the desired shape. Consequently, the glass container bottom 16 is repeatedly heated, so that it has the highest temperature within the glass container 10 over several processing steps. The temperatures are above the vaporization temperatures of some components of the borosilicate glass used, so that in particular sodium evaporates from the bottom area, wherein sodium additionally entrains boron in the form of borates, so that boron is evaporated from the glass, too. At the same time a certain amount of sodium and boron diffuses back into the glass container bottom 16 and the tubular portion 12, wherein the degree of diffusion has a different temperature dependence than the degree of evaporation. The length and the direction of the arrows in FIG. 1 indicate which one of the two processes dominates. Near the bottom the evaporation dominates, whereas with decreasing temperature the diffusion is getting stronger and reaches a maximum in a diffusion zone 22. If the temperature of the glass container 10 decreases further, the diffusion process, too, is becoming increasingly weaker because it becomes increasingly difficult for sodium and boron to penetrate into the glass matrix. Below a certain temperature, neither sodium nor boron can penetrate into the glass matrix so that they form a precipitate 24 on the inner surface 14.

The diffusion zone 22 is located on an annular region 23 on the inner surface 14 of the tubular portion 12 of the glass container 10. The annular region 23 has an end 26 facing to the bottom and an end 28 facing away from bottom. The end 26 facing to the bottom has a distance $L_B$ from the glass container bottom 16 in a range between approximately 0 and 20 mm. In addition, the end 28 facing away from the bottom and the end 28 facing to the bottom are spaced apart at a distance $L_A$ in a range between approximately 1 and 10 mm. Here, the annular region 23 is not necessarily congruent with the diffusion zone 22. The diffusion zone 22 is disposed on the annular region 23, but need not extend completely thereon.

Figure 2:
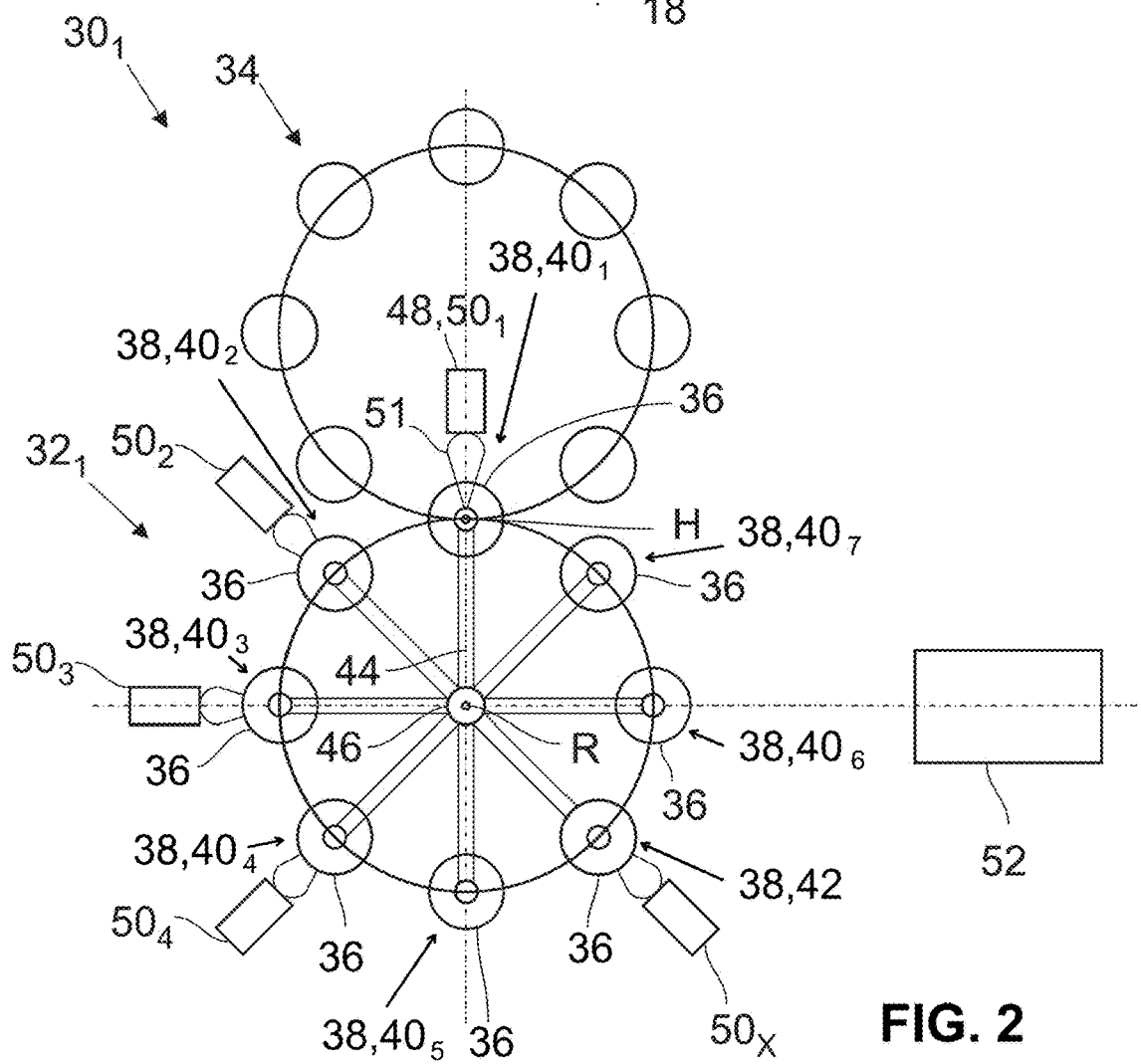
FIG. 2 shows a first embodiment of a glass processing apparatus according to the invention based on a principal illustration.

FIG. 2 shows a glass processing apparatus $30_1$ according to the invention comprising a bottom side machine $32_1$ and a parent machine 34 according to a first exemplary embodiment. The bottom side machine $32_1$ comprises a number of holding units 36, each of which comprising a chuck (not shown in detail) into which a glass tube (not shown) can be chucked. The holding units 36 or chucks on the one hand are rotatable about their own axis H and on the other hand about the axis R. In the example shown the bottom side machine 32 comprises eight holding units 36 that can be carried to a total of eight processing stations 38, which in the example shown are divided into seven primary processing stations $40_1$-$40_7$ and a further processing position 42. Furthermore, the bottom side machine 32 comprises a duct system 44 by means of which a gas, such as air, can be supplied from a pressure source 46 to the holding units 36.

For the production of glass container 10 of FIG. 1, a glass tube (not shown) is first chucked in a chuck 34 of the parent machine 34. An open end of the glass tube (that will eventually become open end 18) protrudes downwardly from the chuck over a predetermined amount with respect to the direction of action of the gravitational force and is subjected to various processing steps, for example, such as to form the rolled rim 20 (see FIG. 1) or a thread. If the open end is completely formed the glass tube is carried into a first primary processing station $40_1$, in which the chuck of the parent machine 34 and the chuck of the bottom side machine 32 are in axial alignment. The chucks of the parent machine 34 are typically located above the chucks of the bottom side machine 32, that's where the bottom side machine 32 has got its name. In the original condition the glass tube has a length of about 1.5 m so that the downwardly protruding part of the glass tube has to be separated from the remaining part for forming the glass container 10. For this purpose, the glass tube is heated at the corresponding point by a separating means 48 which comprises one or more gas burners $50_1$. If the required temperature is reached the holding unit 36 is axially moved upwards with the chuck of the bottom side machine 32 towards the chuck of the parent machine 34, so that it can engage the glass tube. Thereafter, the chuck is again moved downwards axially, wherein the glass tube is separated at the point at which it has been heated while forming two closed bottoms. Already in the first primary processing station $40_1$ a gas stream is introduced into the glass tube through the duct system 44.

The glass container 10, now disposed within the chuck of the bottom side machine 32, comprises the already completely formed open end 18 as well as the closed glass container bottom 16, wherein the glass container bottom 16 has not yet the desired shape. In order to shape the glass container bottom 16 as desired it is treated in a targeted manner with additional gas burners $50_2$ to $50_4$, to which purpose the bottom side machine 32 is carried into the further primary processing stations $40_2$, $40_3$, and $40_4$. The gas burners $50_2$, $50_3$, and $50_4$ are typically adapted to the particular processing step. During the processing by the gas burners $50_2$ to $50_4$ in addition a gas stream is introduced into the now closed glass container 10. If the glass container 10 has passed through the primary fourth processing station $40_4$ the glass container bottom 16 is finished to such an extent that the glass container 10 now can be brought to the desired length. To this end, the glass container 10 is pressed in the primary fifth processing station $40_5$ against a bottom side die (not shown).

Subsequently, the glass container 10 is moved to the further processing station 42 in which the annular region 23 of the inner surface 14 of the tubular portion 12 is heated to a treatment temperature $T_{Beh}$ which is above the transformation temperature. This thermal treatment is carried out with a gas burner $50_X$ which heats the glass container 10 from the outside by means of a flame provided by it and maintains the glass container for the desired time period at the treatment temperature $T_{Beh}$. In order to achieve a uniform thermal treatment of the annular region 23 the holding unit 36 is rotated together with the glass container 10 about the axis H. The reference symbol $50_X$ is to clarify that the gas burner $50_X$ is not present in conventional glass processing apparatuses and comprises certain modifications that are tailored to the specific requirements of the thermal treatment of the annular region 23. A thermal treatment by means of other heat sources, for example by means of a laser or by use of short-wave infrared radiation, is also conceivable.

Depending on the embodiment of the method the glass container 10 may be blown out prior to the thermal treatment of the annular region 23, which can be implemented with the same gas which is introduced into the glass container 10 during the formation of the glass container bottom 16.

Subsequently to the thermal treatment the glass container 10 is carried into the sixth primary processing station $40_6$ and removed from the chuck. In the seventh primary processing position $40_7$ usually no processing is carried out. From the sixth primary processing station $40_6$ the glass container 10 is then carried into a stress relief furnace 52 in which the glass container 10 is relieved by heating to a stress relief temperature. After completion of the stress relief process the glass container 10 is removed from the stress relief furnace 52 and cooled, which can be done passively by storage at room temperature or by active cooling in a cooling unit (not shown) in a targeted manner. The cooled glass container 10 can now be used.

Figure 3:
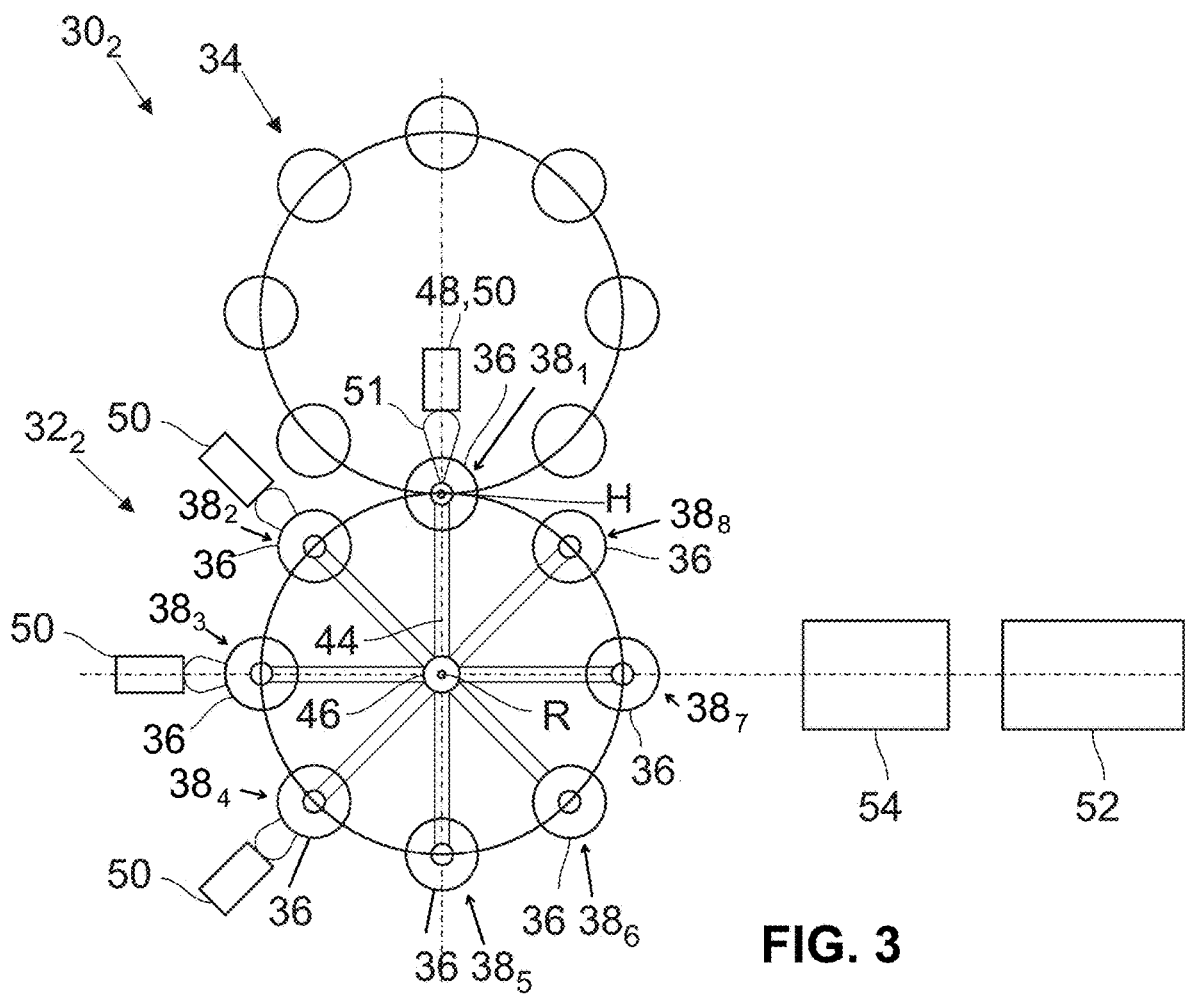
FIG. 3 shows a second embodiment of a glass processing apparatus according to the invention, also based on a principal illustration.

FIG. 3 shows a second exemplary embodiment of the glass processing apparatus $30_2$ according to the invention which also comprises a bottom side machine $32_2$ and a parent machine 34. Unlike the first exemplary embodiment the glass processing apparatus $30_2$ according to the second example comprises a commercial bottom side machine $32_2$ with a total of eight processing stations, namely $38_1$, $38_2$, $38_3$, $38_4$, $38_5$, $38_6$, $38_7$, and $38_8$. Here, no distinction between primary and further processing stations can be made since the thermal treatment of the annular region 23 is not carried out at the bottom side machine $32_2$ but in a separate heat treatment station 54. In place of the further processing station 40 of the bottom side machine $32_2$ in the second exemplary embodiment a processing station $38_6$ is provided at which the glass container 10 may be cooled.

The glass container 10 is removed from the bottom side machine 32 at the seventh processing station $38_7$ and supplied to the heat treatment station 54, which is arranged in the processing direction of the glass container 10 between the bottom side machine 32 and the stress relief furnace 52. In the heat treatment station 54 the annular region 23 of the glass container 10 is thermally treated as described above, then stress relieved in the stress relief furnace 52 and subsequently cooled.

Figure 4:
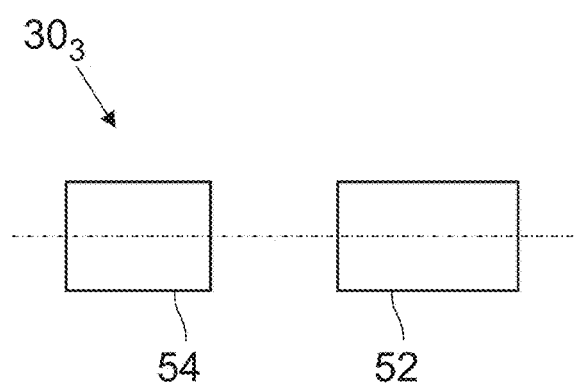
FIG. 4 shows a third embodiment of a glass processing apparatus according to the invention, also based on a principal illustration.

FIG. 4 shows a third exemplary embodiment of the glass processing station $30_3$ according to the invention which includes only the heat treatment station 54 and the stress relief furnace 52. The heat processing station 54 and the stress relief furnace 52 are arranged spatially separated from the bottom side machine 32 and the parent machine 34. This embodiment is suitable for glass containers 10 which have been produced in a conventional manner and are now post-processed according to the invention. In this case there is a long time period between the formation of the glass container bottom 16 and the thermal treatment of the annular region 23. By means of an appropriate process control the stress relief of the glass container 10 after the thermal treatment of the annular region 23 can be omitted.

Figure 5:
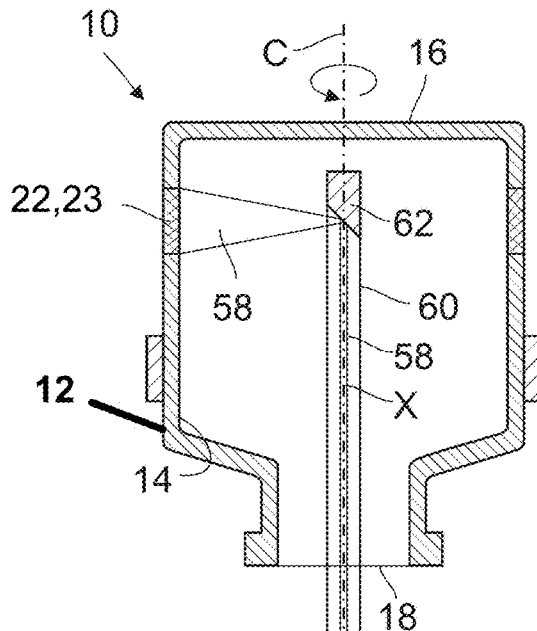
FIG. 5 shows a glass container, the annular region of which is thermally treated from the inside by means of a laser in a heat treatment station.
Figure 6:
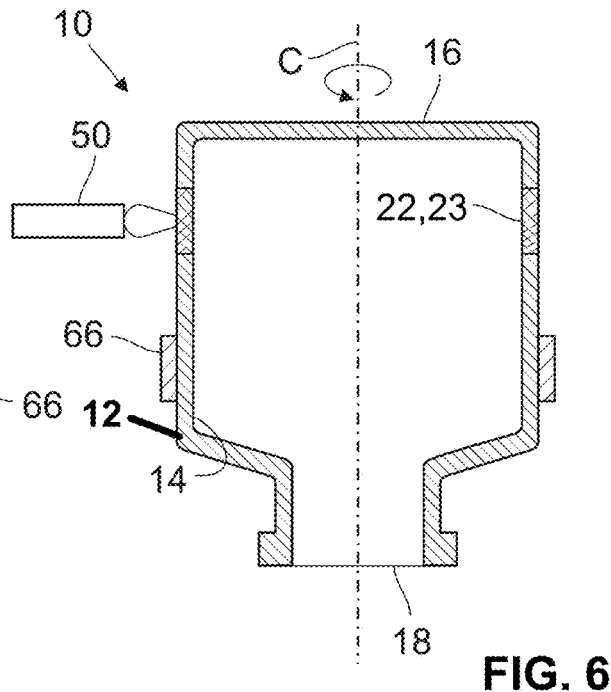
FIG. 6 shows a glass container, the annular region of which is thermally treated from outside by means of a gas burner in a heat treatment station.

FIGS. 5 and 6 show two different ways in which the annular region 23 can be thermally treated in the heat treatment station 54. In FIG. 5 the heat treatment station 54 includes a laser 56 which provides a laser beam 58. As a laser 56 in this context an apparatus should be understood by which the laser beam 58 is generated. The laser 56 has a substantially tubular guide portion 60 by means of which the laser beam 58 is guided and protected against external influences. At the same time the guide portion 60 also serves to protect persons who are staying in the immediate vicinity of the laser 56 or the laser beam 58. At the distal end of the guide portion 60 a deflection means 62 is disposed which ensures that the laser beam 58 is deflected by approximately 90° and exits radially from the guide portion 60. The guide portion 60 may comprise an opening or a window at the place where the laser beam 58 exits and is otherwise closed. Moreover, the deflection means 62 is configured so that it effects a widening of the laser beam 58. Assuming an approximately circular cross section of the laser beam 58 after exiting the laser 56 the laser beam 58 is modified upon impinging on the deflection means 62 such that it exhibits an approximately elliptical, oval or rectangular cross section.

In addition, the laser 56 comprises a shifting means 64 by means of which the laser 56 may be moved forward and backward at least along the axis X of the laser beam 58 after exiting the laser 56.

In the heat treatment station 54 the glass container 10 is held and transported by means of a support means 66. The support means 66 may be configured so that the glass container 10 may perform a two or three dimensional movement.

The support means 66 moves the glass container 10 into a position in which the container axis C and the axis X of the laser beam 58 after exiting the laser 56 approximately lie on each another. Depending on the design of the shifting means and the support means 66 the glass container 10 is moved toward the laser 56 so that the guide portion 60 is inserted through the open end 18 into the glass container 10 to such an extent that the deflected laser beam 58 impinges onto the inner surface 14 and can cover the annular region 23 from the inside of the glass container 10. Alternatively, the laser 56 can be moved toward the glass container 10 or both components may be moved toward each other. It is also conceivable to configure the guide portion 60 telescopically, for example, so that only the guide portion 60 is moved. Then, either the glass container 10 is rotated by means of the support means 66 or the laser 56 or the guide portion 60 is rotated by means of the shifting means so that the annular region 23 is completely covered by the laser beam 58 and hence heated. The glass container 10 therefore has to be rotated by at least 360° relative to the laser 56 or the laser beam 58, wherein also a rotation about an integer multiple of 360° is conceivable, in order to maintain the annular region 23 at the treatment temperature $T_{Beh}$ for the entire time required.

After the thermal treatment the glass container 10 is moved away from laser 56 so that the guide portion 60 no longer protrudes beyond the open end into the glass container 10. The glass container 10 can now be transported by means of the support means 66 to the stress relief furnace 52 and be further treated in the manner already explained above.

FIG. 6 shows a second way how the annular region 23 of the glass container 10 may be thermally treated in the heat treatment station 54. In this case, the heat treatment station 54 comprises a gas burner 50 which is arranged stationary in the heat treatment station 54. The glass container 10 is positioned by means of the support means 66 relative to the gas burner 50 such that the annular region 23 can be thermally treated from the outside by means of the gas burner 50. Since the gas burner 50 can be rotated about the glass container 10 only with considerable mechanical effort in this case the glass container 10 is rotated about the own container axis C by means of the support means 66 so that the annular region 23 is uniformly heated to the treatment temperature $T_{Beh}$.

After the thermal treatment of the annular region 23 the glass container 10 can now be transported to the stress relief furnace 52 by means of the support means 66 and be further treated in the manner already described above.

Instead by means of the gas burner 50 the annular region can be treated in the same manner from the outside by means of a laser 56.

Figure 7:
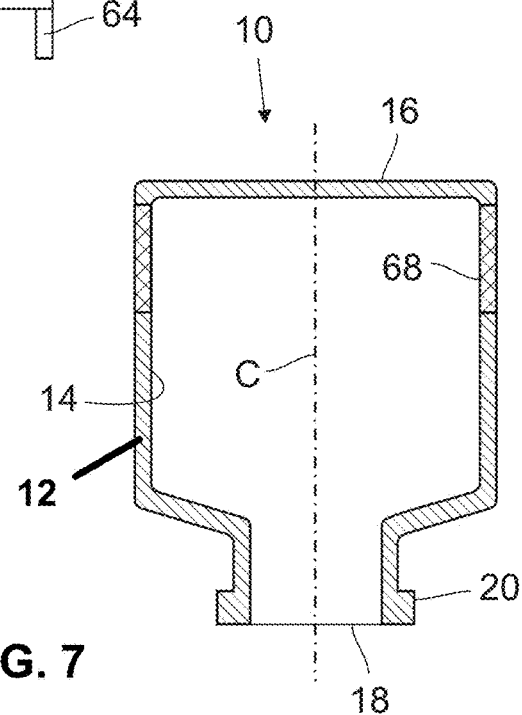
FIG. 7 shows a glass container produced by means of the method according to the invention.

FIG. 7 shows a glass container 10 which has been treated by the method according to the invention. The glass container 10 comprises a plastic deformation 68 at the tubular portion 12. The plastic deformation 68 is a result of the thermal treatment of the annular region 23 from outside of the glass container 10. In the treatment from the outside the entire wall has to be heated so that the treatment temperature $T_{Beh}$ is achieved on the inner surface 14. Due to the low viscosities of the entire wall achieved thereby a local flow of the glass container 10 cannot be prevented. This effect can be increasingly occur when a gas burner is used for the thermal treatment since the emitted gas exerts a back pressure onto the outer surface of the glass container 10 and thus promotes the local flow. The plastic deformation 68 is typically located in the annular region 23 or between the annular region 23 and the glass container bottom 16 (see FIG. 1). The plastic deformation 68 can be used in appropriate quality checks as an evidence if a glass container 10 has been thermally treated according to the invention or not.

| LIST OF REFERENCE SYMBOLS | |
|---|---|
| 10 | glass container |
| 12 | tubular portion |
| 14 | inner surface |
| 16 | glass container bottom |
| 18 | open end |
| 20 | rolled rim |
| 22 | diffusion zone |
| 23 | annular region |
| 24 | precipitate |
| 26 | end facing to the bottom |
| 28 | end facing away from the bottom |
| 30, $30_1$-$30_3$ | glass processing apparatus |
| 32, $32_1$, $32_2$ | bottom side machine |
| 34 | parent machine |
| 36 | holding unit |
| 38, $38_1$-$38_8$ | processing station |
| 40, $40_1$-$40_7$ | primary processing station |
| 42 | further processing station |
| 44 | duct system |
| 46 | pressure source |
| 48 | separating means |
| 50, $50_1$-$50_X$ | gas burner |
| 51 | flame |
| 52 | stress relief furnace |
| 54 | heat treatment station |
| 56 | laser |
| 58 | laser beam |
| 60 | guide portion |
| 62 | deflection means |
| 64 | shifting means |
| 66 | support means |
| 68 | plastic deformation |
| C | container axis |
| H | axis of holding unit |
| $L_A$ | distance |
| $L_B$ | distance |
| R | axis of bottom side machine |
| $T_{Beh}$ | treatment temperature |
| $T_E$ | stress relief temperature |
| $T_G$ | transformation temperature |
| X | axis |

What is claimed is:

1. A method for thermally treating an annular region of an inner surface of a borosilicate glass container, wherein the annular region is at a tubular portion of the glass container, the method comprising the steps of:
   forming a glass container bottom from a glass tube and thermally processing the glass container bottom to obtain a shape of the glass container bottom, wherein during the thermally processing of the glass container bottom a diffusion zone is formed that extends at least partially over the annular region, wherein during the thermally processing of the glass container bottom, boron accumulates in the diffusion zone, while boron simultaneously depletes in the glass container bottom;
   heating only the annular region of the inner surface to a treatment temperature between 700 and 1000° C.;
   maintaining the treatment temperature for a period of time so that boron diffuses out of the diffusion zone; and
   cooling the glass container to room temperature;
   wherein the annular region has an end facing to the glass container bottom and an end facing away from the glass container bottom, wherein the end facing to the glass container bottom has a distance $L_B$ from the inside of the glass container bottom along an axis of the glass container of 0 and 20 mm and a distance $L_A$ between the end facing to the bottom and the end facing away from the bottom is between 1 and 10 mm.

2. The method according to claim 1, wherein the period of time is between 1 and 20 seconds.

3. The method according to claim 1, wherein the heating step comprises heating with a laser from inside the glass container.

4. The method according to claim 1, wherein the heating step comprises heating by a gas burner or a laser from outside the glass container.

5. The method according to claim 1, further comprising preheating the glass container, prior to the heating step, to a preheating temperature of 400 to 660° C.

6. The method according to claim 1, further comprising preheating the glass container, prior to the heating step, so that the glass container has a viscosity of $10^{12.4}$ dPa sec or less.

7. The method according to claim 1, further comprising the step of relieving stress from the glass container in a stress relief furnace at a stress relief temperature at which a viscosity of the glass container is $10^{13.3}$ dPa sec or less.

8. The method according to claim 1, further comprising the step of blowing out vaporous boron from the glass container with a gas stream, after the forming step and before the heating step.

9. A method for thermally treating an annular region of an inner surface of a borosilicate glass container,
   wherein the glass container comprises a glass tube having a longitudinal axis, a first end of the glass tube, and a second end of the glass tube,
   the method comprising the steps of:
   forming a bottom of the glass container on the glass tube at the first end, wherein the bottom is a closed container bottom, wherein the container further comprises an annular region;
   heating only the annular region of the glass container to a treatment temperature between 700 and 1000° C., wherein the heating is done from inside the glass tube;
   maintaining the treatment temperature for a period of time; and
   cooling the glass container to room temperature after the period of time has elapsed;
   wherein the annular region has an end facing to the glass container bottom and an end facing away from the glass container bottom, the end facing to the glass container bottom has a distance $L_B$ from the inside of the glass container bottom along a container axis of 0 and 20 mm and the distance $L_A$ between the end facing to the bottom and the end facing away from the bottom is between 1 and 10 mm.

10. The method of claim 9, wherein the heating only the annular region of the glass container step is conducted with a laser.

11. A method for thermally treating an annular region of an inner surface of a borosilicate glass container,
   wherein the glass container comprises a glass tube having a longitudinal axis, a first end of the glass tube, and a second end of the glass tube,
   the method comprising the steps of:
   forming a bottom of the glass container on the glass tube at the first end, wherein the bottom is a closed container bottom, wherein the container further comprises an annular region;
   heating only the annular region of the glass container to a treatment temperature between 700 and 1000° C., wherein the heating is done from outside the glass tube;
   maintaining the treatment temperature for a period of time; and cooling the glass container to room temperature after the period of time has elapsed;
wherein the annular region has an end facing to the glass container bottom and an end facing away from the glass container bottom, the end facing to the glass container bottom has a distance $L_B$ from the inside of the glass container bottom along a container axis of 0 and 20 mm and the distance $L_A$ between the end facing to the bottom and the end facing away from the bottom is between 1 and 10 mm.

* * * * *